United States Patent [19]

Fraser

[11] 4,087,634
[45] May 2, 1978

[54] DUAL SOUND TRACK SENSOR AND CALIBRATION STRIP THEREFOR

[76] Inventor: Kenneth Donald Fraser, 56 Gatesview Avenue, Scarborough, Ontario, Canada

[21] Appl. No.: 638,349

[22] Filed: Dec. 8, 1975

[51] Int. Cl.² ............................................ G03B 31/02
[52] U.S. Cl. ...................... 179/100.3 L; 179/100.3 E; 179/100.3 T; 179/100.3 B; 360/109; 352/27; 357/32; 179/100.3 P
[58] Field of Search ................. 179/100.3 R, 100.3 E, 179/100.3 L, 100.3 T, 100.3 B, 100.1 A, 100.41 L; 360/109, 3, 121, 122, 126, 106, 110; 352/27, 29; 250/211 R; 357/30, 32

[56] References Cited

U.S. PATENT DOCUMENTS

| 2,911,539 | 11/1959 | Tanenbaum | 357/32 |
|---|---|---|---|
| 2,972,022 | 2/1961 | Byrd | 179/100.3 R |
| 3,344,240 | 9/1967 | Bottani | 179/100.3 L |
| 3,352,975 | 11/1967 | Floden | 179/100.3 R |
| 3,591,267 | 7/1971 | Kakiuchi | 352/29 |
| 3,964,826 | 6/1976 | Joseph | 179/100.3 E |

*Primary Examiner*—Bernard Konick
*Assistant Examiner*—Alan Faber

[57] ABSTRACT

A sensing device for use with a motion picture projector for projecting a motion picture having a sound track with two or more sound channels, said projector having a light source for illuminating said sound track, said sensing device having a base or fixed portion adapted to be fastened to a suitable portion of the motion picture projector, such as a housing, and a moveable support member adjustably connected to said base portion, and adjustment means for adjusting said support member relative to said fixed portion, and two or more photo voltaic cells mounted on the moveable portion, each having a width dimension appropriate to the width of one of said sound channels, and each separated by a small gap.

7 Claims, 6 Drawing Figures

DUAL SOUND TRACK SENSOR AND CALIBRATION STRIP THEREFOR

The present invention relates to an optical sensing device for use with a motion picture film sound track in which two sound channels are recorded on such sound track.

BACKGROUND OF THE INVENTION

Conventional motion picture films incorporate a sound track having a single channel of sound recorded thereon. However, in order to provide for greater versatility, it is desirable to record two channels of sound on the sound track, in parallel channels. Thus two sound channels can be recorded in different languages. Stereo sound tracks, for use in 35 mm film in large theaters, may be recorded in the same way. A greater number of sound channels may give still further versatility so that three, four or five sound channels may be usefully employed in some cases. In the case of two sound channels the width of each channel of sound will be slightly less than half of the total width. Obviously, the signal to noise ratio will be reduced, and the intrusion of noise signals over the actual sound signals will be greatly increased. For these reasons, the use of dual sound tracks or channels on such motion picture films has been of only very limited application.

In addition the mechanical problems involved in sensing the optically recorded signals on each channel are greatly increased where more than one such channel is used, particularly on 16 mm film where the sound track is already narrow in itself.

For example, in the 16 mm motion picture film width, the space available for the sound track is only about 1.5 mm wide. In addition, it is necessary to leave a narrow margin or "septum" between the two sound tracks, usually about 0.5 mm, which still further restricts the space available for recorded sound. Thus if it is attempted to record dual sound tracks on two channels side by side, each sound channel will be about 0.5 mm.

Obviously, any sound recorded on such reduced width channel, which for example receives a scratch or abrasion, will be distorted to a proportionately greater degree, than if the sound were recorded on the entire width of the space available.

Conventional sound systems for single sound track film involve a light source and a light sensitive device which may be sensitive over a relatively wide area. This however is not harmful as it is a monaural sound track and there is no possibility of picking up interference from an adjacent channel.

Where multiple sound channels are used however the light sensitive device must be capable of reacting with maximum sensitivity to one channel without any interference or "cross-talk" from the others.

It is therefore desirable for all these reasons that the sensing devices for generating the sound signals in response to the sound recorded on the multiple channels be more accurate and sensitive. It is particularly important that, when using one of the sound channels on a selective basis, for example, where the sound channels are in two different languages, the sensing device be effective to pick up the signals from one sound channel, without receiving any interference or distortion from signals recorded on other sound channels.

In addition to the foregoing considerations, it is also of course desirable that the sensing device should be capable of being installed as a modification to existing equipment, as well as being installed as an optional feature in new equipment.

In addition to the foregoing considerations, considerable difficulties are experienced in adjusting to achieve optimum performance on both channels, when using a length of actual film with a multiple sound track. Accordingly, it is desirable to create a specially recorded calibration film having a sound track recorded thereon which is particularly adapted and suitable for the calibration of the sensing device, the calibration film strip having the same number of sound channels, for calibration purposes, as will be carried on the actual film to be projected.

BRIEF SUMMARY OF THE INVENTION

The invention provides a sound sensing system for a motion picture film having two or more sound tracks, and in which there are two or more light sensitive signal generating cells mounted side by side, and located so as to register with respective sound tracks so that each sound track causes the generation of signals in its respective signal generating cell.

The invention further provides sensing device having a base or fixed portion adapted to be fastened to a suitable portion of the motion picture projector, such as a housing, and a movable support member attached to said base portion, and adjustment means for adjusting said support member relative to said fixed portion, and two or more photo voltaic cells mounted on the movable portion, each having a width dimension appropriate to the width of one of said sound channels, and each separated by a small gap.

More specifically, the invention seeks to provide a sensing device of the type described and having the foregoing advantages which incorporates adjustment means for adjusting the support member relative to the base portion in two planes, when the projector is in operation.

More specifically, it is an objective of the invention to provide a sensing device of the type described having the foregoing advantages in which the voltaic cells comprise a single voltaic cell element, and one or more straight-line grooves cut partially through said cell element dividing the same into two or more cells.

It is a further and a related objective of the invention to provide a film strip having multiple sound track recorded thereon, for use in the calibration of the sensing device according to the invention.

The invention is described with particularity in the appended claims. For a better understanding of the various principles of the invention, and the way in which it may be carried out, reference may be had to the following description of a preferred embodiment which is given purely by way of illustration, and with reference to the following drawings.

DESCRIPTION OF A SPECIFIC EMBODIMENT

Figure 1:
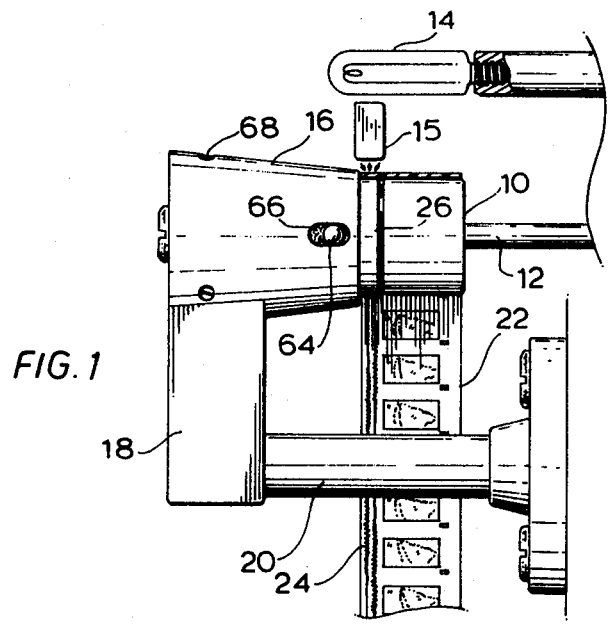
FIG. 1 is a side elevational view showing the sound sensing portion of a motion picture projector in schematic form.

As is best shown in FIG. 1, a typical motion picture projector will incorporate a free running roller 10 mounted on a spindle 12 which is attached to the main body (not shown) of the projector. There will normally be a light source such as the lamp 14 located above or below or adjacent to the roller 10, and a lens assembly 15 between such light source or lamp 14 and the actual film. A sensing device, typically a photoelectric cell (not shown) is located within a housing 16. The housing 16 is mounted on a stand 18 which is in turn fastened to the main body of the projector by means of the support bar 20.

A length of film shown as 22 having a sound track 24 is shown passing over the roller 10. It will be noted that the roller 10 is narrower than the film 22, so as to expose the sound track 24 to one side of the roller 10.

The housing 16 has a reduced neck portion 26 which extends beneath the sound track 24, immediately in registration with the lamp 14 and lens assembly 15.

As stated, the arrangement as indicated is essentially typical of many forms of projector. Some different designs of projector may incorporate a somewhat different layout, with the film lying in a vertical plane, and having the lamp to one side and the photoelectric cell to the other, but the end result is the essence the same.

It will be understood that the invention is applicable to a sound track having two or more separate sound channels. For the sake of simplicity however the invention will be described with reference to two sound channels, it being, of course, apparent that by simple modification it can be adapted for more than two channels where required.

In accordance with the present invention, the standard photoelectric cell is absent from the housing 16, and the sound sensing system according to the invention is located in its place.

Figure 2:
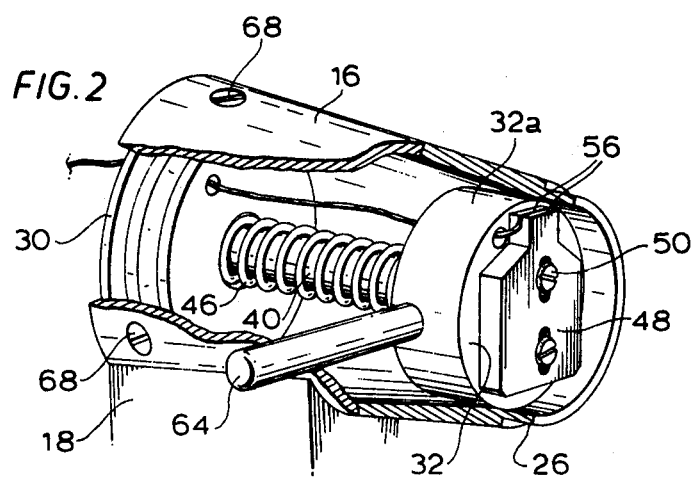
FIG. 2 is a perspective illustration partially cut away to show the sound sensing device according to the invention.
Figure 3:
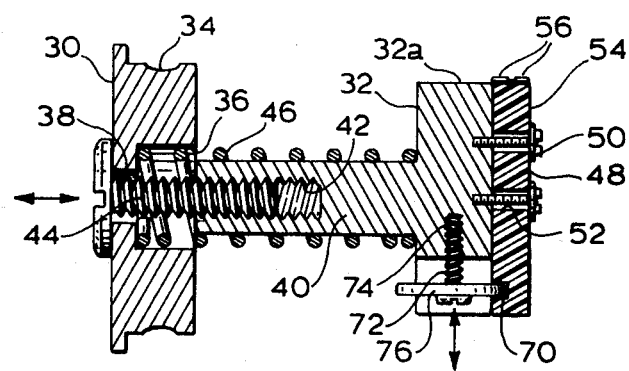
FIG. 3 is a section along the line III-III of FIG. 2.
Figure 4:
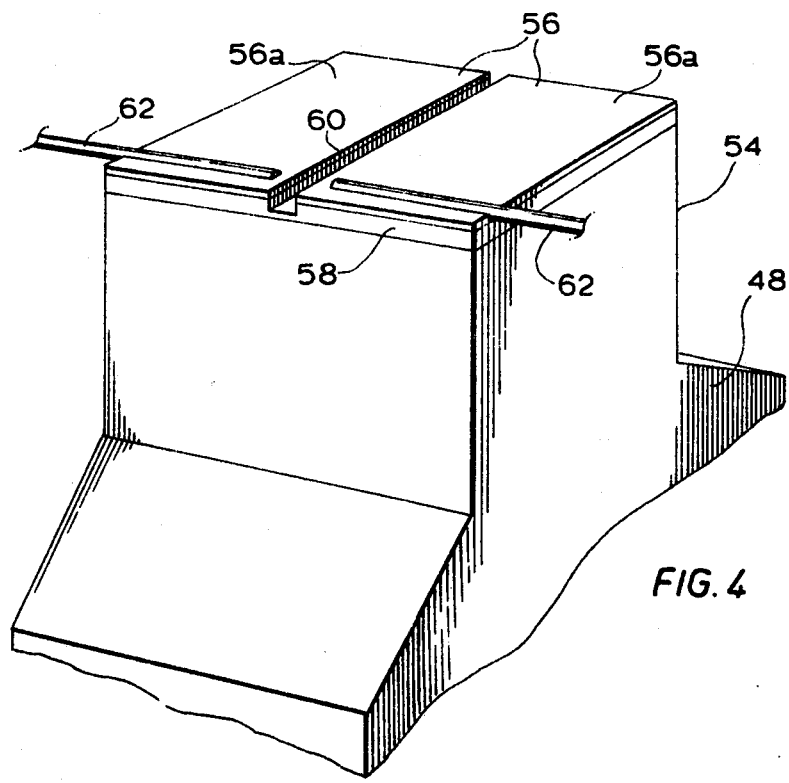
FIG. 4 is a greatly enlarged perspective illustration of the photo voltaic cells.

This is best shown in FIGS. 2, 3 and 4. It will be seen to comprise a fixed portion or base member 30, and a movable support member 32. The base member 30 (see FIG. 3) is provided with an annular groove 34, and a central recess 36 extending partially through its thickness, and a smaller bore 38 communicating from the interior of the recess 36 through the remainder of the base 30.

The movable support member 32 is comprised of an enlarged circular support head 32a, and a supporting stem portion 40, provided with an interior screw threaded recess 42.

An adjustment screw 44 passes through the bore 38 and is threadedly engaged in the recess 42. A spring 46 extends around the exterior of the stem 40, and extends into the interior of the recess 36. The spring 46 normally urges the stem 40 outwardly, and adjustment of the screw 44 will draw the stem 40 down into the recess 36, or will release it to extend outwardly therefrom.

A plate member 48 is adjustably fastened to the outwardly directed side of the circular head portion 32a, by means of screws 50 passing through slotted openings 52. Preferably, the plate 48 is made of insulating material. At the top of the plate 48 a reduced width pillar portion 54 is located, and on the top of the pillar portion 54 are located a pair of photo voltaic cells 56-56.

Clearly, if desired, the plate member 48 could be made of conducting material, in which case the photo voltaic cells 56 could be insulated by any suitable form of insulation interposed therebetween.

As best shown in FIG. 4, the photo voltaic cells 56 comprise a single unitary lower layer 58, and two separate upper layers 56a, separated by a straight-line groove 60. In fact, the photo voltaic cells can be made from a single piece of photo voltaic material, by simply cutting the groove 60 sufficient to completely separate into two halves, the upper layer 56a or the cells can manufactured with such grooves 60 in some other way.

Suitable electrical wiring 62 is fastened, for example by solder to the lower layer 58 and to the two upper layer portions 56a-56a. The lower layer 58 is fastened for example by adhesive to the pillar portion 54.

Alternatively the wiring can be replaced by printed circuits according to well known techniques.

The wiring may be carried rearwardly through a suitable opening provided in the supporting head 32, and through a similar opening in the base 30, or, may alternatively be led downwardly through the column 18.

It will be understood that the reduced neck portion 26 of the housing 16 is provided with a suitable opening (not shown) in registration with the photo voltaic cells 56, whereby the cells 56 may in fact be able to scan the sound track. The adjustment provided in the sensing device according to the invention permits an axial movement of the photo voltaic cells 56, towards and away from the roller 10, by means of operating the adjustment screw 44. However, in order to avoid overadjustment, which might damage the photo volatic cells 56, or jam the roller 10, a limiting device is incorporated in the form of the stop pin 64 extending through a suitable slotted opening 66 in the housing 16.

The base member 30 is secured in the housing 16 by means of the set screws 68, which are received within the annular recess 34 in the base 30. In this way the sensing device may readily be installed or removed for servicing or replacement.

To provide for more precise adjustment of the cells 56 a groove 70 is cut in the rear face of plate 48, and a locking screw 72 is located in the threaded bore 74 in head portion 32a. The screw 72 has an annular flange 76 extending from its head which engages in groove 70. Rotation of screw 72 will gradually raise or lower plate 48 providing for fine adjustment of its position. Screws 50 may then be tightened up to lock plate 48 in position. A suitable opening (not shown) will of course be provided in housing 16 registering with screw 72 to facilitate access for adjustment.

It will be seen that by means of the invention it is possible to adjust the positioning of the cells 56 both in a vertical plane, by means of the screws 50, and also in a horizontal axial plane. In this way, it is possible to position the cells 56 as close as possible to the underside of the film, and at the same time to adjust the axial position of the cells 56 so as to line them up with their respective sound track.

Where it is desired to use sensing device of the invention for a sound track which may be in either of two or more languages, then of course, any suitable electrical circuits (not shown) will be provided for selecting the signal from either one or both or more of the two cells 56, and for driving a loud speaker system, and/or headphones.

On the other hand, where the mulitiple sound track on the motion picture film is for example a stereophonic sound track, then somewhat different, but essentially conventional circuitry will be used, and the sound from both cells 56 relayed simultaneously to the audio equipment.

In either case however it is essential that the alignment of the cells 56 with their respective sound tracks be set up and calibrated with considerable care.

This is of course done by listening to the sound track on one side or the other alternately, while running the motion picture film through the projector, and making gradual adjustments by operation of the adjusting screw 44. However, with a conventional motion picture film, where the sound track incorporates portions of music and portions of speech, such adjustment can be lengthy and time consuming since it is sometimes difficult to distinguish whether the sound is coming from one track or the other.

Figure 6:
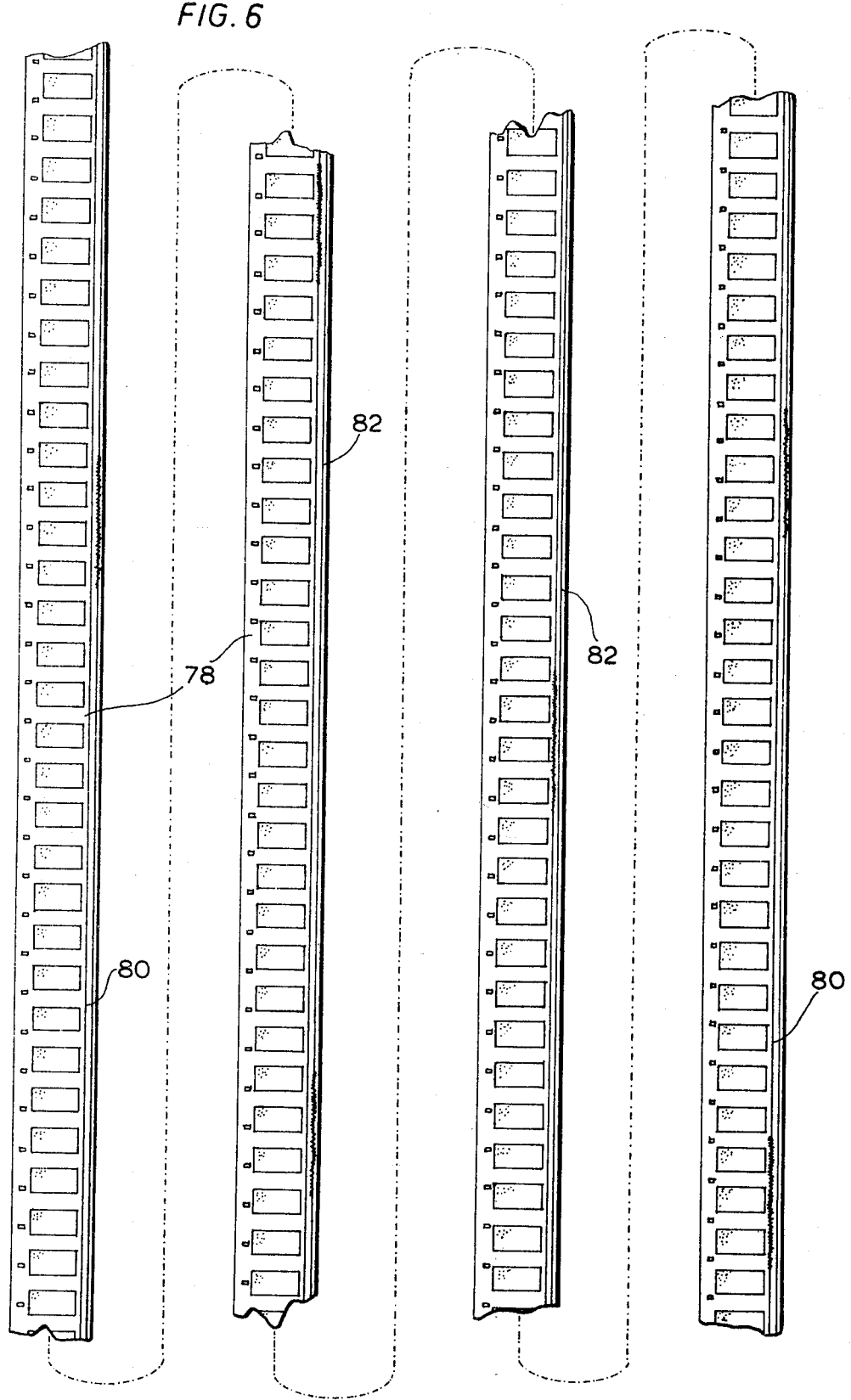
FIG. 6 is a schematic illustration greatly enlarged showing a portion of a film strip prepared for calibration of the sensing device of the invention.

Accordingly, it is also within the scope of the invention to provide a film strip, preferably in the form of a closed loop, a portion of which is shown in FIG. 6 as 78. The film strip 78 is provided with a special dual sound track namely left and right sound tracks 80 and 82. On the left hand sound track there will be recorded a series of sounds, for example the word "left", and between these series of sounds, there will be no sound whatever. Similarly on the right hand track 80 a series of sounds for example the word "right", will be repeated, separated by periods of silence.

The sounds on the respective right and left hand tracks will be out of step with one another, as shown schematically in FIG. 6 so that while for example the sound on the right hand track can be heard, the left hand track is silent.

Preferably, the timing of the occurrence of the words will be such that they are spaced apart by a gap of approximately 1 second of silence, corresponding to about one half foot of film, between sounds on the same track.

When using the special calibration film loop, the left hand channel of sound reproducing equipment (not shown) will be switched on, and the operator will hear a sound repeated, for example the word "left", continuously. If he should hear any interference or slight sound between any two sounds on the left hand channel, he will then know that some slight adjustment must be made since the left hand cell 56 is picking up some cross talk from the right hand channel.

On the other hand, if he hears no cross talk on the left hand channel, he then switches to the right hand channel and if he hears any cross talk on the right hand channel he can then make the opposite adjustment.

By the use of such a special calibration film loop having sounds recorded on separate channels, the sounds being spaced apart from one another by periods of silence, and the sounds on alternate channel being out of step with one another, it is possible to accurately calibrate the instrument in a very short space of time.

Such a calibration film strip may also be provided with more than two sound channels where required, the two tracks shown being merely exemplary and not by way of limitation. In such cases the sounds on each such track would preferably be different from each other eg. "left", "centre", "right" or "left one", "left two", "right one", "right two" — or any other suitable sounds distinguishing each track.

The sound track of the calibration strip may also usefully carry selected test tones at different audio frequencies so that the entire audio system can be adjusted at the same time.

It will of course be understood that the performance of the invention will be improved by adjusting the cells 56 until they are as close as possible to the sound track.

Since in most projectors the film is running around a roller 10 at the location of the sensing unit, the film is, of course, curved. The cells 56 are however flat and consequently there is bound to be a small gap left between the film and the cells 56, which may cause some slight loss of signal strength.

Figure 5:
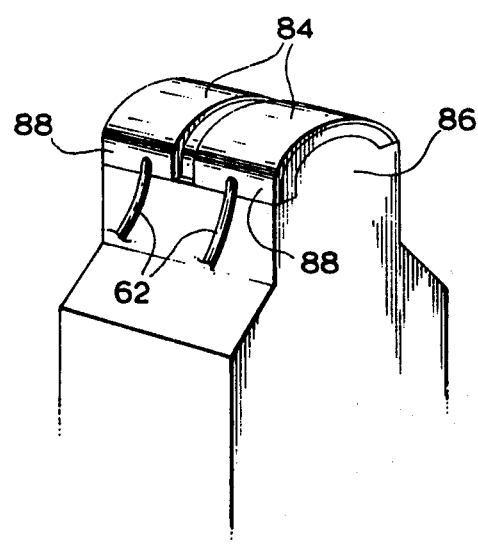
FIG. 5 is a perspective view of an alternate embodiment.

Accordingly the invention also provides that, where maximum performance is essential the cells may be constructed as shown in FIG. 5.

In such a modified form the cells are shown as 84 constructed in arcuate form around a radius corresponding to the radius of for example the roller 10, or in any event corresponding the radius around which the film runs in any particular projector. Curved cells 84 will be mounted on any suitable curved support 86, corresponding to the plate 48 of FIG. 2. The curved cells 84 may be provided with endwise extensions 88 bent inwardly with respect to the arc described, for attachment of the wires 62.

The same or any other form of adjustment (not shown) may be used.

For example, instead of moving the support member 32 relative to the film, the film could be moved relative to the support member, and the support member would be fastened on one position. A simple system of film guide shoes, or rollers, (not shown) could move to and fro and/or up and down as required.

The foregoing is a description of a preferred embodiment of the invention which is given here by way of example only. The invention is not to be taken as limited to any of the specific features as described, but comprehends all such variations thereof as come within the scope of the appended claims.

What is claimed is:

1. A sensing device for use in association with a motion picture projector for projecting motion picture film of the type having a sequence of picture frames, and a sound track on one side margin thereof only, said sound track having at least two separate sound channels thereon side by side with one another and said projector having a single light source for illuminating the whole of said sound track, said device comprising;

a base portion adapted to be fastened to a suitable portion of said motion picture projector;

a moveable support member connected to said base portion;

a stem portion on said support member; threaded recess means therein, and a threaded screw member extending through a hole in said base portion and engaged in said recess means; spring means extending between said base portion and said support member;

stop means for checking excessive movement of said support member relative to said base portion;

adjustable mounting plate means on said support member;

rotatable threaded adjustment means extending between said mounting plate means and said support member, rotation of said adjustment means moving said plate means relative to said support member to move said plate means towards and away from said motion picture film;

at least two light responsive signal generating units mounted on said adjustable mounting plate means side by side with one another, and spaced apart from one another by a distance such that each said unit registers with a respective said sound channel on said track each said signal generating unit being capable of responding to said single light source illumination through both said channels simultaneously, and, said support member and said mounting plate means being adjustably moveable as aforesaid whereby respective said light responsive signal generating units may be simultaneously oriented in registration with respective said sound channels for receiving light passing therethrough from said common light source, whereby each said unit may generate separate signals in response to illumination of its said separate sound channel without responding to illumination of the remainder of said sound track by said common light source.

2. A sensing device as claimed in claim 1 wherein said signal generating units comprise at least two photo-voltaic cells, and a spacing between adjacent said cells whereby a said cell may register with a said sound channel of said sound track.

3. A sensing device as claimed in claim 2 wherein said cells are formed with a curved upper surface to enable said cells to be located as close as possible to said motion picture film.

4. A sensing device as claimed in claim 1 wherein said units are formed of a single piece of photo voltaic material, said material having upper and under layers, and groove means formed in said upper layer between adjacent said units, with said groove means severing said upper layer, while leaving said under layer intact.

5. A sensing device as claimed in claim 1 wherein there are more than two sound channels on said sound track, spaced apart from one another, and including light responsive signal generating units for each said sound channel, being separated by a similar spacing.

6. A sensing device as claimed in claim 1 including housing means for said signal generating units and said support member, attached at one end to said base member, the other end being free, and a reduced neck portion at said free end about which said motion picture film runs, opening means in said reduced neck portion in registration with said signal generating units.

7. A sensing device as claimed in claim 6 including slotted opening means in said housing means, and a stop pin on said support member extending through said opening means whereby to limit the adjustment of said support member relative to said base member.

* * * * *